(12) United States Patent
Tomita et al.

(10) Patent No.: US 10,581,096 B2
(45) Date of Patent: Mar. 3, 2020

(54) FUEL CELL SYSTEM

(71) Applicant: NISSAN MOTOR CO., LTD., Yokohama-shi, Kanagawa (JP)

(72) Inventors: Yousuke Tomita, Yokohama (JP); Hayato Chikugo, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 872 days.

(21) Appl. No.: 14/407,272

(22) PCT Filed: Jun. 14, 2013

(86) PCT No.: PCT/JP2013/066505
§ 371 (c)(1),
(2) Date: Dec. 11, 2014

(87) PCT Pub. No.: WO2013/187514
PCT Pub. Date: Dec. 19, 2013

(65) Prior Publication Data
US 2015/0162629 A1    Jun. 11, 2015

(30) Foreign Application Priority Data

Jun. 15, 2012 (JP) ................................. 2012-135721

(51) Int. Cl.
*H01M 8/04* (2016.01)
*H01M 8/04291* (2016.01)
(Continued)

(52) U.S. Cl.
CPC ..... *H01M 8/04291* (2013.01); *H01M 8/0485* (2013.01); *H01M 8/04111* (2013.01); *H01M 8/04395* (2013.01); *H01M 8/04529* (2013.01); *H01M 8/04619* (2013.01); *H01M 8/04753* (2013.01); *H01M 8/04776* (2013.01); *H01M 8/0435* (2013.01); *H01M 8/0438* (2013.01); *H01M 8/04089* (2013.01); *H01M 8/04432* (2013.01); *H01M 2008/1095* (2013.01)

(58) Field of Classification Search
CPC ..................... H01M 8/04291; H01M 8/04111
See application file for complete search history.

(56) References Cited

FOREIGN PATENT DOCUMENTS

| JP | 2003-208911 A | 7/2003 |
|----|---------------|--------|
| JP | 2008-016399 A | 1/2008 |

(Continued)

*Primary Examiner* — Barbara L Gilliam
*Assistant Examiner* — Zhongqing Wei
(74) *Attorney, Agent, or Firm* — Young Basile Hanlon & MacFarlane, P.C.

(57) ABSTRACT

A fuel cell system calculates a target value of a flow rate of cathode gas to be supplied to a fuel cell stack according to a request of the fuel cell stack, controls a flow rate of the cathode gas to be supplied by the compressor according to an operating state of the fuel cell system, controls a bypass valve based on a target fuel cell supply flow rate so that the flow rate of the cathode gas to be supplied from the compressor to the fuel cell stack reaches the target fuel cell supply flow rate, and limits the flow rate of the cathode gas to be supplied by the compressor when the bypass valve has a predetermined opening and the flow rate of the cathode gas to be supplied to the fuel cell stack is not smaller than the target fuel cell supply flow rate.

6 Claims, 7 Drawing Sheets

(51) Int. Cl.
*H01M 8/04746* (2016.01)
*H01M 8/04492* (2016.01)
*H01M 8/04537* (2016.01)
*H01M 8/04828* (2016.01)
*H01M 8/0438* (2016.01)
*H01M 8/04111* (2016.01)
H01M 8/1018 (2016.01)
H01M 8/04089 (2016.01)
H01M 8/0432 (2016.01)

(56) References Cited

FOREIGN PATENT DOCUMENTS

| | | | |
|---|---|---|---|
| JP | 2008016399 A | * | 1/2008 |
| JP | 2009-123550 A | | 6/2009 |
| JP | 2010-153079 A | | 7/2010 |
| JP | 2012-109182 A | | 6/2012 |

* cited by examiner

FUEL CELL SYSTEM

CROSS REFERENCE TO RELATED APPLICATION

The present application claims priority to Japanese Patent Application No. 2012-135721 filed with the Japan Patent Office on Jun. 15, 2012, all the contents of which are hereby incorporated by reference.

TECHNICAL FIELD

The present invention relates to a fuel cell system.

BACKGROUND

In the case of using a compressor to supply cathode gas to a fuel cell stack, the compressor has to supply more cathode gas than the amount of air to be supplied to the fuel cell stack to avoid the surge of the compressor and the like in some cases. However, the fuel cell stack does not require the amount of air other than that necessary for power generation and wetness control. Thus, JP2009-123550A discloses a conventional fuel cell system in which, out of cathode gas discharged from a compressor, the amount of air unnecessary for a fuel cell stack is discharged to a cathode gas discharge passage via a bypass passage.

SUMMARY

However, the inventors found out a possibility of the following inconvenience in the case of the conventional fuel cell system described above.

Normally, a pressure higher than an atmospheric pressure is set in an upstream side of a bypass passage since it is equal to a pressure in a fuel cell stack. On the other hand, a cathode gas discharge passage is provided downstream of the bypass passage and a pressure therein is equivalent to the atmospheric pressure.

Accordingly, by opening a bypass valve provided in the bypass passage, a bypass flow rate can be gained due to this differential pressure. However, there is a possibility that the amount of air unnecessary for the fuel cell stack cannot flow into the bypass passage even if the bypass valve is fully opened such as when a pressure of the fuel cell stack has to be dropped for thermal protection of the compressor and the like.

At this time, the compressor only allows the flow at a flow rate necessary to avoid the surge and the like and a flow rate required by the fuel cell stack is not considered. Thus, air that cannot flow into the bypass passage is supplied to the fuel cell stack and there is a possibility of causing an inconvenience that a controlled wet state is shifted toward a dry side.

The present invention was developed in view of such a problem and aims to suppress the supply of air unnecessary for a fuel cell stack even if an opening of a bypass valve reaches a predetermined opening or larger.

According to one aspect of the present invention, a fuel cell system is provided which includes a compressor configured to supply the cathode gas, a bypass passage configured to discharge a part of the cathode gas discharged from the compressor to a cathode gas discharge passage while bypassing the fuel cell stack, a bypass valve provided in the bypass passage and configured to adjust a flow rate of the cathode gas flowing in the bypass passage, a target fuel cell supply flow rate calculation unit configured to calculate a target value of a flow rate of the cathode gas to be supplied to the fuel cell stack according to a request of the fuel cell stack, a compressor supply flow rate control unit configured to control a flow rate of the cathode gas to be supplied by the compressor according to an operating state of the fuel cell system, a bypass valve control unit configured to control the bypass valve based on a target fuel cell supply flow rate so that the flow rate of the cathode gas to be supplied from the compressor to the fuel cell stack reaches the target fuel cell supply flow rate, and a compressor supply flow rate limiting unit configured to limit the flow rate of the cathode gas to be supplied by the compressor when the bypass valve has a predetermined opening and the flow rate of the cathode gas to be supplied to the fuel cell stack is not smaller than the target fuel cell supply flow rate.

An embodiment and advantages of the present invention are described in detail below with reference to the accompanying drawings.

DESCRIPTION OF EMBODIMENTS

In a fuel cell, an electrolyte membrane is sandwiched by an anode electrode (fuel electrode) and a cathode electrode (oxidant electrode) and power is generated by supplying anode gas (fuel gas) containing hydrogen to the anode electrode and cathode gas (oxidant gas) containing oxygen to the cathode electrode. Electrode reactions which proceed in both anode and cathode electrodes are as follows.

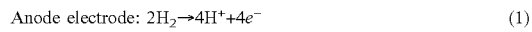

$$\text{Anode electrode: } 2H_2 \rightarrow 4H^+ + 4e^- \tag{1}$$

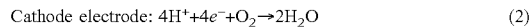

$$\text{Cathode electrode: } 4H^+ + 4e^- + O_2 \rightarrow 2H_2O \tag{2}$$

The fuel cell generates an electromotive force of about 1 volt by these electrode reactions (1) and (2).

In the case of using a fuel cell as a power source for automotive vehicle, a fuel cell stack in which several hundreds of fuel cells are laminated is used since required power is large. By configuring a fuel cell system for supplying the anode gas and the cathode gas to the fuel cell stack, power for driving a vehicle is taken out.

Figure 1:
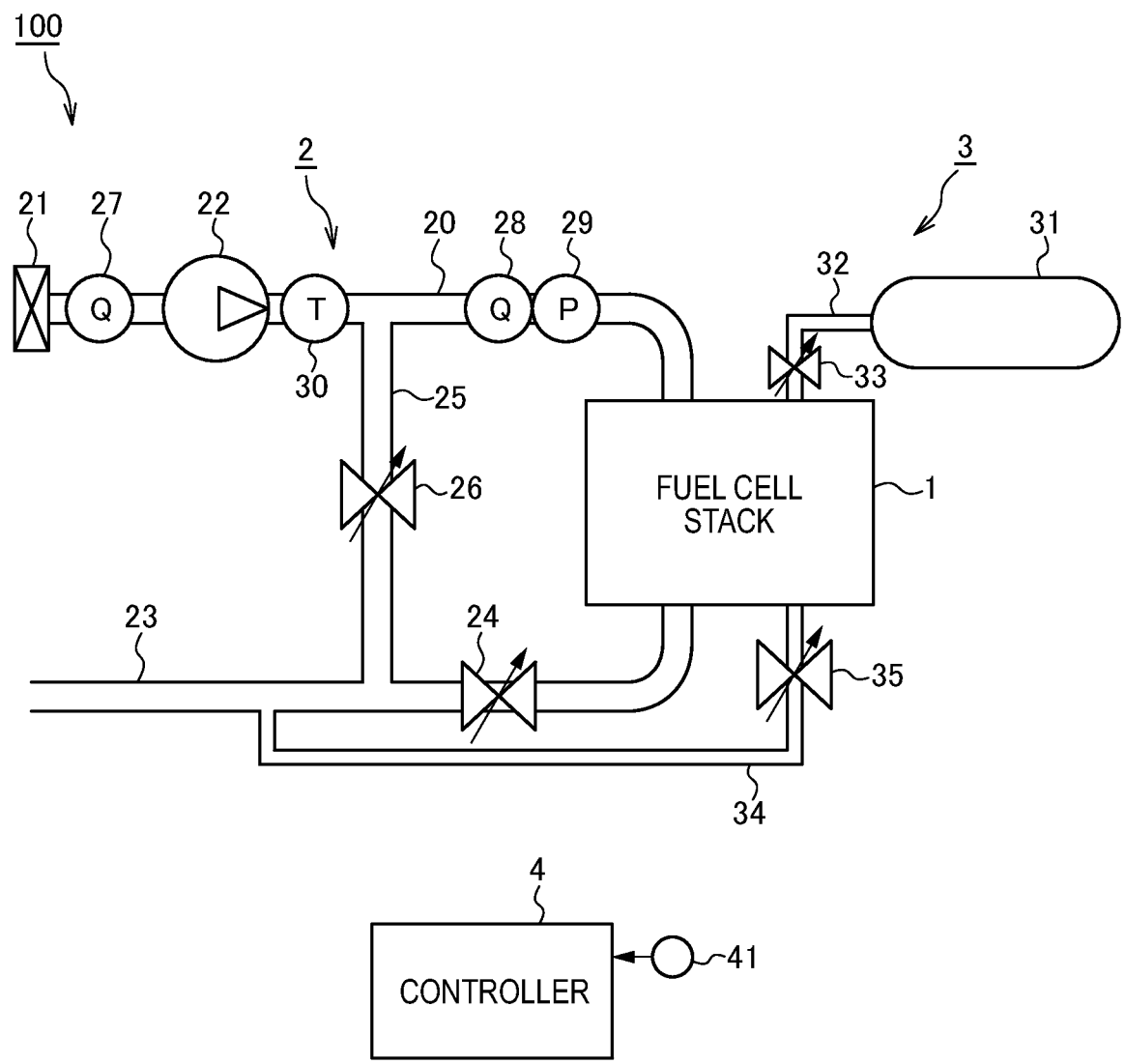
FIG. 1 is a schematic diagram of a fuel cell system according to one embodiment of the present invention.

FIG. 1 is a schematic diagram of a fuel cell system 100 according to one embodiment of the present invention.

The fuel cell system 100 includes a fuel cell stack 1, a cathode gas supplying/discharging device 2, an anode gas supplying/discharging device 3 and a controller 4.

The fuel cell stack 1 is formed by laminating several hundreds of fuel cells and generates power necessary to drive a vehicle upon receiving the supply of the anode gas and the cathode gas.

The cathode gas supplying/discharging device 2 is a device for supplying the cathode gas to the fuel cell stack 1 and discharging cathode off-gas discharged from the fuel cell stack 1 to outside air. The cathode gas supplying/discharging device 2 includes a cathode gas supply passage 20, a filter 21, a cathode compressor 22, a cathode gas discharge passage 23, a cathode pressure regulating valve 24, a bypass passage 25, a bypass valve 26, a first flow rate sensor 27, a second flow rate sensor 28, a pressure sensor 29 and a temperature sensor 30.

The cathode gas supply passage 20 is a passage in which the cathode gas to be supplied to the fuel cell stack 1 flows. One end of the cathode gas supply passage 20 is connected to the filter 21 and the other end is connected to a cathode gas inlet hole of the fuel cell stack 1.

The filter 21 removes foreign substances in the cathode gas to be taken into the cathode gas supply passage 20.

The cathode compressor 22 is provided in the cathode gas supply passage 20. The cathode compressor 22 takes air (outside air) as the cathode gas into the cathode gas supply passage 20 via the filter 21 and supplies it to the fuel cell stack 1.

The cathode gas discharge passage 23 is a passage in which the cathode off-gas discharged from the fuel cell stack 1 flows. One end of the cathode gas discharge passage 23 is connected to a cathode gas outlet hole of the fuel cell stack 1, and the other end serves as an opening end.

The cathode pressure regulating valve 24 is provided in the cathode gas discharge passage 23. The cathode pressure regulating valve 24 is on-off controlled by the controller 4 to adjust a pressure of the cathode gas to be supplied to the fuel cell stack 1 to a desired pressure.

The bypass passage 25 is a passage provided to enable a part of the cathode gas discharged from the cathode compressor 22 to be directly discharged to the cathode gas discharge passage 23 without via the fuel cell stack 1 if necessary. One end of the bypass passage 25 is connected to a part of the cathode gas supply passage 20 downstream of the cathode compressor 22 and the other end is connected to a part of the cathode gas discharge passage 23 downstream of the cathode pressure regulating valve 24.

The bypass valve 26 is provided in the bypass passage 25. The bypass valve 26 is on-off controlled by the controller 4 to adjust a flow rate of the cathode gas flowing in the bypass passage 25 (hereinafter, referred to as a "bypass flow rate").

The first flow rate sensor 27 is provided in a part of the cathode gas supply passage 20 upstream of the cathode compressor 22. The first flow rate sensor 27 detects a flow rate of the cathode gas to be supplied to the cathode compressor 22 (hereinafter, referred to as a "compressor supply flow rate").

The second flow rate sensor 28 is provided in a part of the cathode gas supply passage 20 downstream of a connected part to the bypass passage 25, i.e. a part of the cathode gas supply passage 20 near the cathode gas inlet hole of the fuel cell stack 1. The second flow rate sensor 28 detects a flow rate of the cathode gas to be supplied to the fuel cell stack 1 (hereinafter, referred to as a "stack supply flow rate").

The pressure sensor 29 is provided in a part of the cathode gas supply passage 20 downstream of the connected part to the bypass passage 25, i.e. a part of the cathode gas supply passage 20 near the cathode gas inlet hole of the fuel cell stack 1. The pressure sensor 29 detects an inlet pressure of the fuel cell stack (hereinafter, referred to as a "stack inlet pressure").

The temperature sensor 30 is provided in a part of the cathode gas supply passage 20 near a discharge side of the cathode compressor 22. The temperature sensor 30 detects a temperature of the cathode gas discharged from the cathode compressor 22 (hereinafter, referred to as a "discharge temperature").

The anode gas supplying/discharging device 3 is a device for supplying the anode gas to the fuel cell stack 1 and discharging anode off-gas discharged from the fuel cell stack 1 to the cathode gas discharge passage 23. The anode gas supplying/discharging device 3 includes a high-pressure tank 31, an anode gas supply passage 32, an anode pressure regulating valve 33, an anode gas discharge passage 34 and a purge valve 35.

The high-pressure tank 31 stores the anode gas to be supplied to the fuel cell stack 1 in a high-pressure state.

The anode gas supply passage 32 is a passage for supplying the anode gas discharged from the high-pressure tank 31 to the fuel cell stack 1. One end of the anode gas supply passage 32 is connected to the high-pressure tank 31 and the other end is connected to an anode gas inlet hole of the fuel cell stack 1.

The anode pressure regulating valve 33 is provided in the anode gas supply passage 32. The anode pressure regulating valve 33 is on-off controlled by the controller 4 to adjust a pressure of the anode gas to be supplied to the fuel cell stack 1 to a desired pressure.

The anode gas discharge passage 34 is a passage in which the anode off-gas discharged from the fuel cell stack 1 flows. One end of the anode gas discharge passage 34 is connected to an anode gas outlet hole of the fuel cell stack 1 and the other end is connected to the cathode gas discharge passage 23.

The anode-off gas discharged to the cathode gas discharge passage 23 via the anode gas discharge passage 34 is mixed with the cathode off-gas and the cathode gas having flowed in the bypass passage 25 in the cathode gas discharge passage 23 and discharged to the outside of the fuel cell system 100. Since the anode off-gas contains excess anode gas (hydrogen) not used in the electrode reaction, a hydrogen concentration of exhaust gas is reduced to or below a predetermined specific concentration by mixing the anode off-gas with the cathode off-gas and the cathode gas and discharging it to the outside of the fuel cell system 100 in this way.

The purge valve 35 is provided in the anode gas discharge passage 34. The purge valve 35 is on-off controlled by the controller 4 to adjust a flow rate of the anode off-gas discharged from the anode gas discharge passage 34 to the cathode gas discharge passage 23.

The controller 4 is configured by a microcomputer including a central processing unit (CPU), a read-only memory (ROM), a random access memory (RAM) and an input/output interface (I/O interface). To the controller 4 are input signals from various sensors such as an atmospheric pressure sensor 41 for detecting an atmospheric pressure besides the first flow rate sensor 27, the second flow rate sensor 28, the pressure sensor 29 and the temperature sensor 30 described above.

The controller 4 feedback-controls the cathode compressor 22 and the bypass valve 26 to simultaneously satisfy two requests, i.e. a request to set the hydrogen concentration in the exhaust gas discharged to the outside of the fuel cell system 100 to or below a predetermined concentration (hereinafter, referred to as a "dilution request") and a request to generate power required by each electric component of the fuel cell system 100 such as a drive motor (hereinafter, referred to as a "required output power") by the fuel cell stack 1 (hereinafter, referred to as a "power generation request") based on these input signals.

Figure 2:
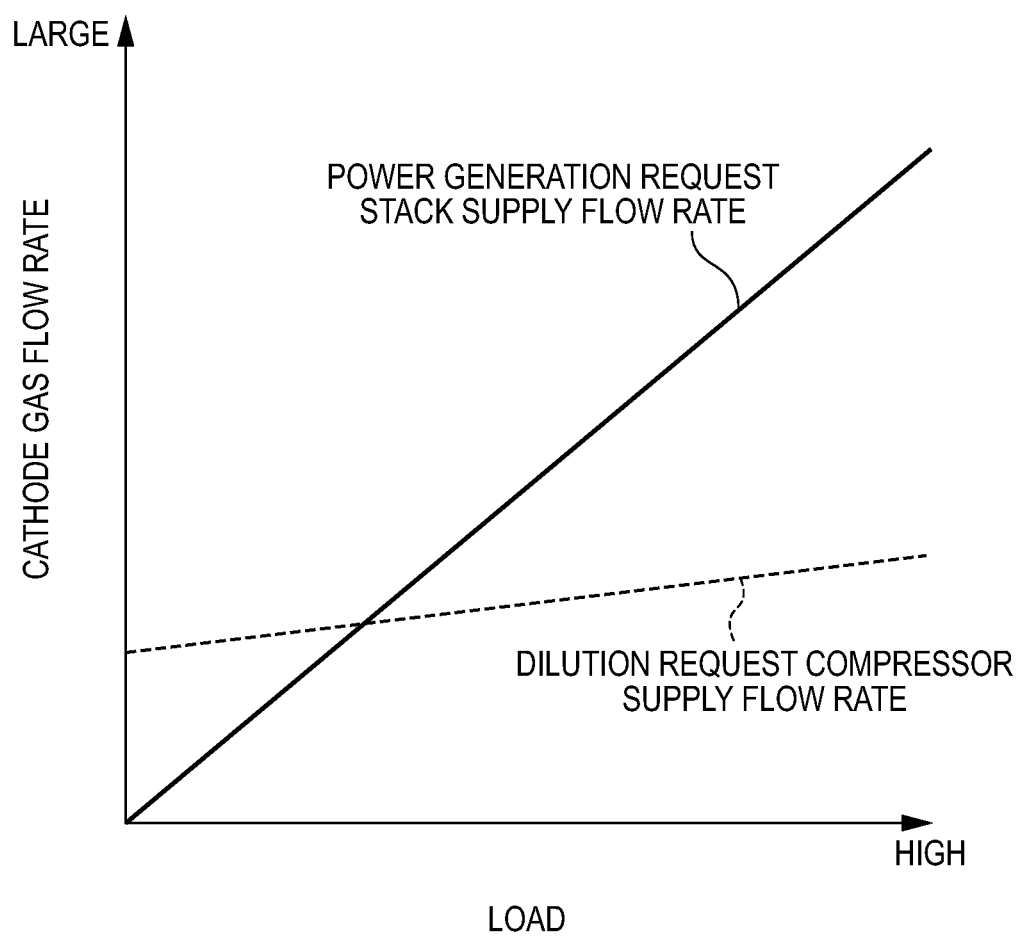
FIG. 2 is a graph showing a relationship of a dilution request compressor supply flow rate and a power generation request stack supply flow rate according to a load of a fuel cell stack.

FIG. 2 is a graph showing a relationship of a compressor supply flow rate necessary to set the hydrogen concentration of the exhaust gas discharged to the outside of the fuel cell system 100 to or below the predetermined concentration (hereinafter, referred to as a "dilution request compressor supply flow rate) and a stack supply flow rate necessary to generate required output power (hereinafter, referred to as a "power generation request stack supply flow rate) according to a load (=required output power) of the fuel cell stack 1.

As shown in FIG. 2, the power generation request stack supply flow rate is larger than the dilution request compressor supply in middle and high load regions.

In this case, the flow rate of the cathode gas to be supplied to the fuel cell stack 1 becomes the power generation request stack supply flow rate if the cathode compressor 22 is simply feedback-controlled with a target compressor supply flow rate set as the power generation request stack supply flow rate. Thus, the required power can be generated by the fuel cell stack 1. Then, by diluting the anode off-gas having flowed into the cathode gas discharge passage 23 from the anode gas discharge passage 34 with the cathode off-gas discharged from the fuel cell stack 1, the hydrogen concentration of the exhaust gas can be set to or below the predetermined concentration.

On the other hand, as shown in FIG. 2, the dilution request compressor supply flow rate is larger than the power generation request stack supply flow rate in a low load region.

In this case, the required power can be generated by the fuel cell stack 1 if the cathode compressor 22 is simply feedback-controlled with the target compressor supply flow rate set as the power generation request stack supply flow rate. However, the hydrogen concentration of the exhaust gas cannot be set to or below the predetermined concentration even if the anode off-gas having flowed into the cathode gas discharge passage 23 from the anode gas discharge passage 34 is diluted with the cathode off-gas discharged from the fuel cell stack 1.

Accordingly, to set the hydrogen concentration of the exhaust gas to or below the predetermined concentration in the low load region, the cathode gas more than a cathode gas flow rate (power generation request stack supply flow rate) necessary to generate the required power by the fuel cell stack 1 needs to be supplied by the cathode compressor 22 by feedback-controlling the cathode compressor 22 with the target compressor supply flow rate set as the dilution request compressor supply flow rate. Then, excess cathode gas unnecessary for power generation is supplied to the fuel cell stack 1, wherefore the electrolyte member of each fuel cell constituting the fuel cell stack 1 may become dry and power generation efficiency of the fuel cell stack 1 may be reduced.

Thus, if the dilution request compressor supply flow rate becomes larger than the power generation request stack supply flow rate, excess cathode gas unnecessary for power generation needs to be flowed into the bypass passage 25 by feedback-controlling the bypass valve 26 so that the stack supply flow rate becomes the power generation request stack supply flow rate while feedback-controlling the cathode compressor 22 with the target compressor supply flow rate set as the dilution request compressor supply flow rate. That is, the bypass valve 26 needs to be so opened that the bypass flow rate reaches a flow rate obtained by subtracting the power generation request stack supply flow rate from the dilution request compressor supply flow rate (dilution request compressor supply flow rate-power generation request stack supply flow rate).

Here, it was found that a problem of reducing power generation efficiency of the fuel cell stack 1 occurred when the bypass valve 26 was fully opened if it was attempted to control the cathode compressor 22 and the bypass valve 26 by such feedback controls. To facilitate the understanding of the present invention, a control of a cathode system according to a comparative example is described with reference to FIG. 7 and a problem when the bypass valve 26 is fully opened is described before a control of a cathode system according to the present embodiment is described.

Figure 7:
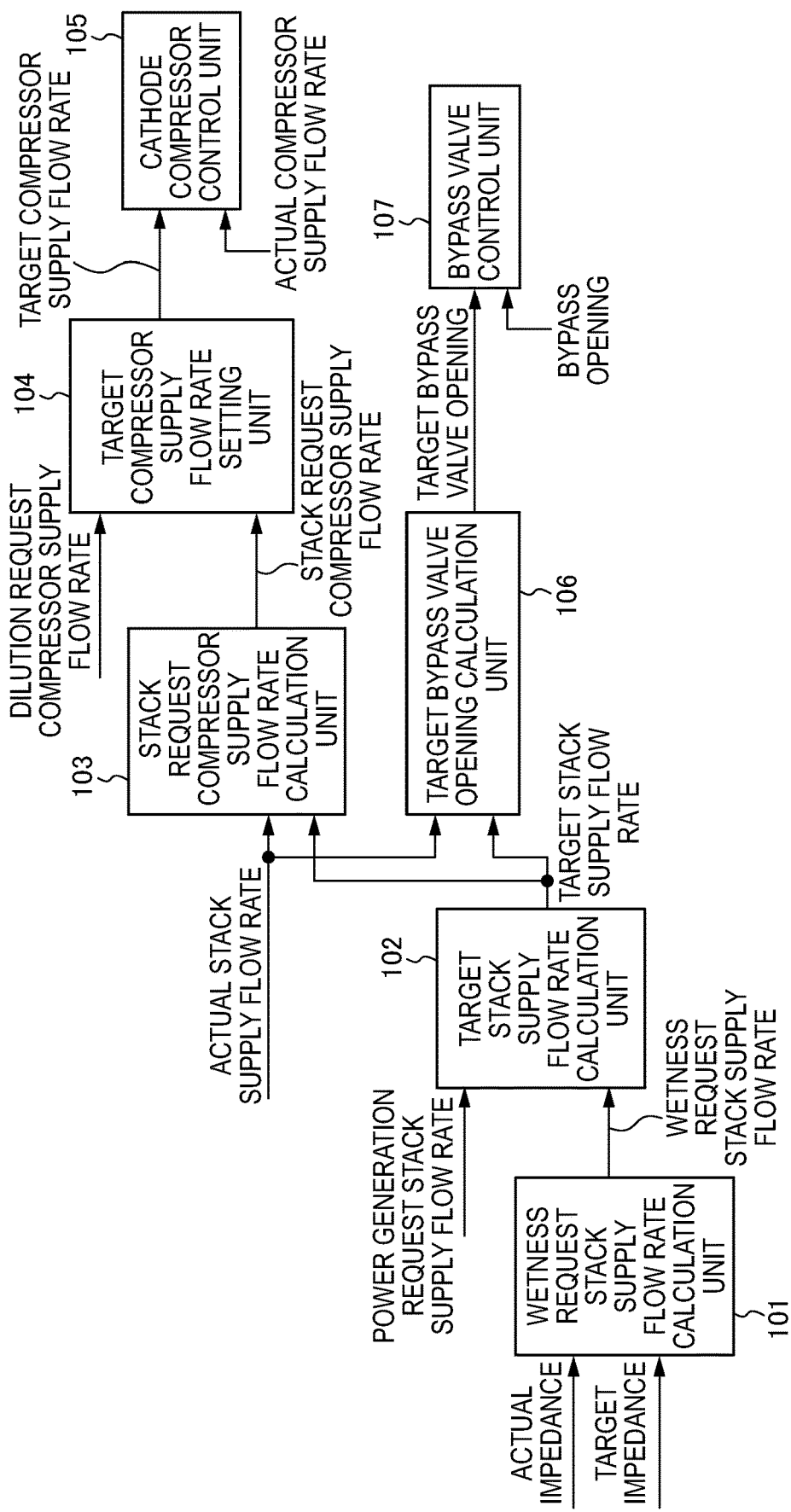
FIG. 7 shows a control block of a cathode system according to a comparative example.

FIG. 7 shows a control block of the cathode system according to the comparative example.

The control block of the cathode system according to the comparative example includes a wetness request stack supply flow rate calculation unit 101, a target stack supply flow rate calculation unit 102, a stack request compressor supply flow rate calculation unit 103, a target compressor supply flow rate setting unit 104, a cathode compressor control unit 105, a target bypass valve opening calculation unit 106 and a bypass valve control unit 107.

An actual impedance of the fuel cell stack 1 calculated by an alternating current impedance method and a target impedance determined in advance according to the load of the fuel cell stack 1 are input to the wetness request stack supply flow rate calculation unit 101.

The wetness request stack supply flow rate calculation unit 101 sets a stack supply flow rate necessary for the actual impedance to reach the target impedance as a reaching wetness request stack supply flow rate and calculates a target value when the stack supply flow rate is changed in a predetermined transient response toward the set reaching wetness request stack supply flow rate as a wetness request stack supply flow rate. The reaching wetness request stack supply flow rate is, in other words, a stack supply flow rate necessary to control a degree of wetness (water content) of the electrolyte membranes to an optimal degree of wetness (required degree of wetness) corresponding to the load of the fuel cell stack 1.

The power generation request stack supply flow rate determined in advance according to the load of the fuel cell stack 1 and the wetness request stack supply flow rate are input to the target stack supply flow rate calculation unit 102. The target stack supply flow rate calculation unit 102 sets the larger one of the power generation request stack flow rate and the wetness request stack supply flow rate as a target stack supply flow rate. In this way, the target stack supply flow rate calculation unit 102 sets an optimal stack supply flow rate corresponding to the load of the fuel cell stack 1 as the target stack supply flow rate.

The stack supply flow rate detected by the second flow rate sensor 28 (hereinafter, referred to as an "actual stack supply flow rate") and the target stack supply flow rate are input to the stack request compressor supply flow rate calculation unit 103. The stack request compressor supply flow rate calculation unit 103 calculates a target value of the compressor supply flow rate to change the actual stack supply flow rate toward the target stack supply flow rate in a predetermined transient response as the stack request compressor supply flow rate.

The dilution request compressor supply flow rate determined according to the load of the fuel cell stack 1 and the stack request compressor supply flow rate are input to the target compressor supply flow rate setting unit 104. The target compressor supply flow rate setting unit 104 sets the larger one of the dilution request compressor supply flow rate and the stack request compressor supply flow rate as the target compressor supply flow rate.

The compressor supply flow rate detected by the first flow rate sensor 27 (hereinafter, referred to as an "actual compressor supply flow rate") and the target compressor supply flow rate are input to the cathode compressor control unit 105. The cathode compressor control unit 105 controls the cathode compressor 22 so that the actual compressor supply flow rate reaches the target compressor supply flow rate.

The actual stack supply flow rate and the target stack supply flow rate are input to the target bypass valve opening calculation unit 106. The target bypass valve opening calculation unit 106 calculates a target bypass valve opening based on a difference between the actual stack supply flow rate and the target stack supply flow rate (actual stack supply flow rate-target stack supply flow rate). The target bypass valve opening is an opening of the bypass valve 26 necessary to allow the flow of the cathode gas of the difference between the actual stack supply flow rate and the target stack supply flow rate into the bypass passage 25 when the actual stack supply flow rate is larger than the target stack supply flow rate. Thus, the target bypass valve opening increases as the difference increases and is zero (fully closed) when the difference is not larger than zero.

The actual opening of the bypass valve 26 and the target bypass valve opening are input to the bypass valve control unit 107. The bypass valve control unit 107 controls the opening of the bypass valve 26 to the target bypass valve opening.

In the control of the cathode system according to this comparative example, the compressor stack supply flow rate necessary to set the stack supply flow rate at the wetness request stack supply flow rate in the stack request compressor supply flow rate calculation unit 103 is calculated as the stack request compressor supply flow rate if the wetness request stack supply flow rate is selected as the target stack supply flow rate in the target stack supply flow rate calculation unit 102.

At this time, if the stack request compressor supply flow rate is larger than the dilution request compressor supply flow rate, the stack request compressor supply flow rate is selected as the target compressor supply flow rate in the target compressor supply flow rate setting unit 104.

Then, the cathode compressor 22 is so feedback-controlled that the compressor supply flow rate becomes the stack request compressor supply flow rate.

In this case, the actual stack supply flow rate converges to the target stack supply flow rate, wherefore the bypass valve 26 is controlled to be fully closed by the feedback control. In this way, the actual impedance is controlled to the target impedance.

On the other hand, if the stack request compressor supply flow rate is smaller than the dilution request compressor supply flow rate, the dilution request compressor supply flow rate is selected as the target compressor supply flow rate in the target compressor supply flow rate setting unit 104.

Then, the cathode compressor 22 is so feedback-controlled that the compressor supply flow rate becomes the dilution request compressor supply flow rate.

In this case, the actual stack supply flow rate becomes larger than the target stack supply flow rate, wherefore the bypass valve 26 is gradually opened by the feedback control so that the actual stack supply flow rate reaches the target stack supply flow rate.

At this time, if the bypass valve 26 is fully opened, the actual stack supply flow rate cannot be set at the target stack supply flow rate and becomes larger than the target stack supply flow rate. If this state continues, the electrolyte membranes become dry and power generation efficiency of the fuel cell stack 1 is reduced. Thus, it is desired to reduce the compressor supply flow rate so that the actual stack supply flow rate reaches the target stack supply flow rate, i.e. the actual impedance reaches the target impedance.

Here, if the actual stack supply flow rate becomes larger than the target stack supply flow rate, a control is executed to reduce the stack request compressor supply flow rate in the stack request compressor supply flow rate calculation unit 103.

However, in the control of the cathode system according to the comparative example, the larger one of the dilution request compressor supply flow rate and the stack request compressor supply flow rate is set as the target compressor supply flow rate in the target compressor supply flow rate setting unit 104. Thus, if the stack request compressor supply flow rate is controlled to be reduced when the dilution request compressor supply flow rate is selected as the target compressor supply flow rate, the dilution request compressor supply flow rate continues to be selected as the target compressor supply flow rate.

As a result, if the bypass valve 26 is fully opened, a state where the actual stack supply flow rate is larger than the target stack supply flow rate continues, thereby causing a problem of reducing power generation efficiency of the fuel cell stack 1.

Accordingly, in the present embodiment, the control of the cathode system is configured to reduce the compressor supply flow rate so that the actual stack supply flow rate reaches the target stack supply flow rate when the bypass valve 26 is fully opened. The control of the cathode system according to the present embodiment is described below.

Figure 3:
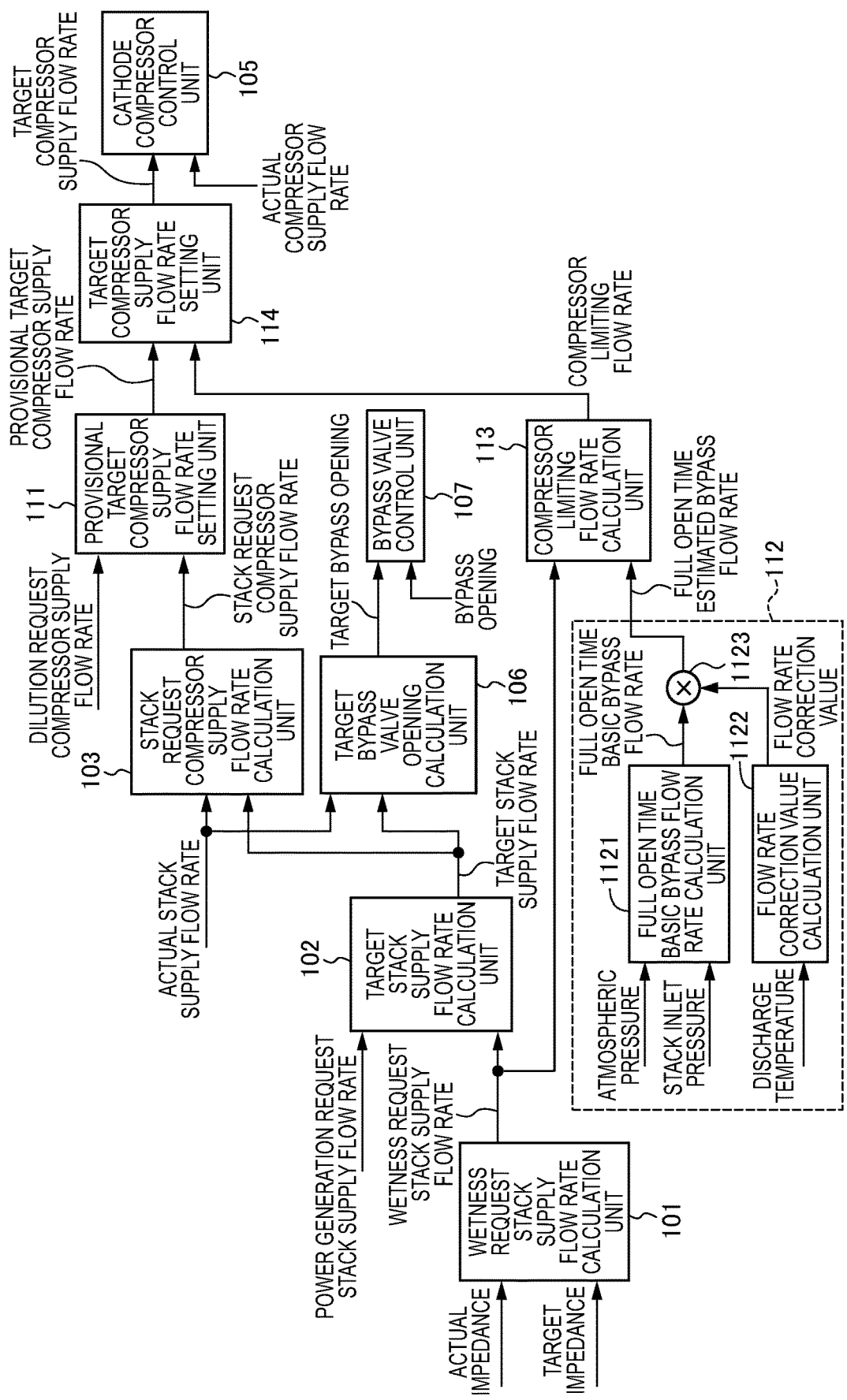
FIG. 3 shows a control block of a cathode system according to the present embodiment.

FIG. 3 shows a control block of the cathode system according to the present embodiment. It should be noted that parts of the control block of the cathode system according to the present embodiment fulfilling functions similar to those of the control block of the cathode system according to the comparative example are denoted by the same reference signs and repeated description thereof is omitted as appropriate.

The control block of the cathode system according to the present embodiment includes a provisional target compressor supply flow rate setting unit 111, a full open time estimated bypass flow rate calculation unit 112, a compressor limiting flow rate calculation unit 113 and a target compressor supply flow rate setting unit 114 besides a wetness request stack supply flow rate calculation unit 101, a target stack supply flow rate calculation unit 102, a stack request compressor supply flow rate calculation unit 103, a cathode compressor control unit 105, a target bypass valve opening calculation unit 106 and a bypass valve control unit 107.

The dilution request compressor supply flow rate and the stack request compressor supply flow rate are input to the provisional target compressor supply flow rate setting unit 111. The provisional target compressor supply flow rate setting unit 111 sets the larger one of the dilution request compressor supply flow rate and the stack request compressor supply flow rate as a provisional target compressor supply flow rate.

The full open time estimated bypass flow rate calculation unit 112 calculates an estimated value of the bypass flow rate when the bypass valve 26 is assumed to be fully open (hereinafter, referred to as a "full open time estimated bypass flow rate") in the current operating state of the fuel cell system 100.

The full open time estimated bypass flow rate calculation unit 112 includes a full open time basic bypass flow rate calculation unit 1121, a flow rate correction value calculation unit 1122 and a multiplication unit 1123.

Figure 4:
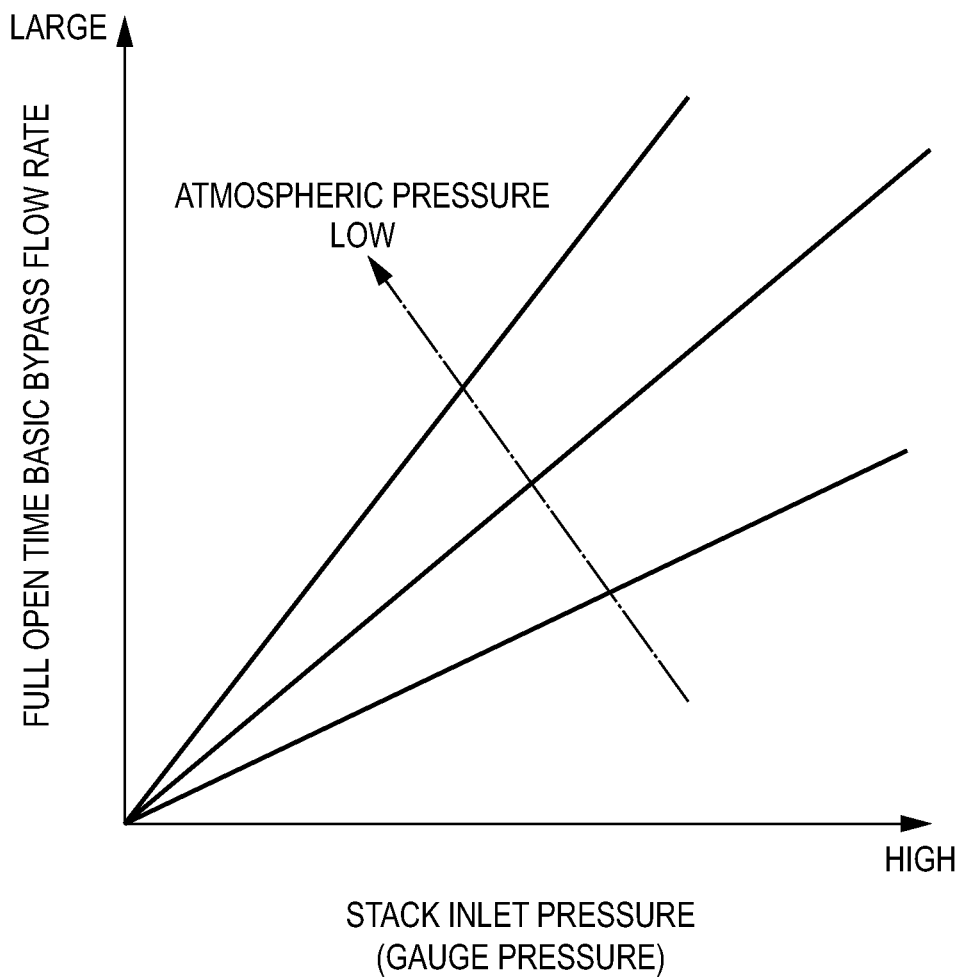
FIG. 4 is a full open time basic bypass flow rate calculation map.

The stack inlet pressure and the atmospheric pressure are input to the full open time basic bypass flow rate calculation unit 1121. The full open time basic bypass flow rate calculation unit 1121 refers to a full open time basic bypass flow rate calculation map shown in FIG. 4 and calculates a full open time basic bypass flow rate based on the stack inlet pressure and the atmospheric pressure. As shown in the full open time basic bypass flow rate calculation map of FIG. 4, the full open time basic bypass flow rate increases with an increase in the stack inlet pressure (gauge pressure), i.e. pressure at a side upstream of the bypass valve 26 since a differential pressure before and after the bypass valve 26 increases. Further, if the stack inlet pressure (gauge pressure) is constant, the full open time basic bypass flow rate increases with a decrease in the atmospheric pressure.

Figure 5:
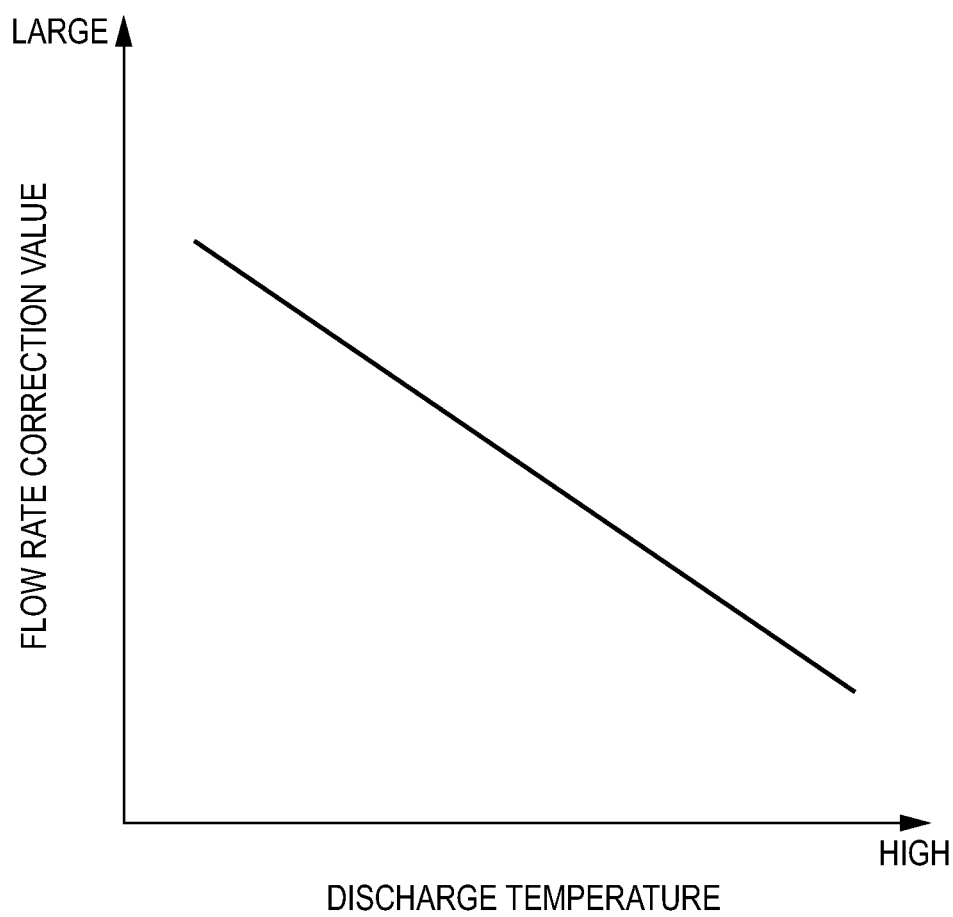
FIG. 5 is a flow rate correction value calculation table.

The discharge temperature is input to the flow rate correction value calculation unit 1122. The flow rate correction value calculation unit 1122 refers to a flow rate correction value calculation table shown in FIG. 5 and calculates a correction value based on the discharge temperature. As shown in the flow rate correction value calculation table of FIG. 5, the flow rate correction value becomes smaller with an increase in the discharge temperature.

The full open time basic bypass flow rate and the flow rate correction value are input to the multiplication unit 1123. The multiplication unit 1123 outputs the product of the full open time basic bypass flow rate and the flow rate correction value as the full open time estimated bypass flow rate.

The wetness request stack supply flow rate and the full open time estimated bypass flow rate are input to the compressor limiting flow rate calculation unit 113. The compressor limiting flow rate calculation unit 113 calculates a compressor limiting flow rate by adding the wetness request stack supply flow rate and the full open time estimated bypass flow rate.

The provisional target compressor supply flow rate and the compressor limiting flow rate are input to the target compressor supply flow rate setting unit 114. The target compressor supply flow rate setting unit 114 sets the smaller one of the provisional target compressor supply flow rate and the compressor limiting flow rate as the target compressor supply flow rate. In this way, the target compressor supply flow rate setting unit 114 sets an optimal compressor supply flow rate corresponding to the operating state of the fuel cell system as the target compressor supply flow rate, considering the operating state of the fuel cell system such as a dilution request, a power generation request and a wetness request.

According to the control of the cathode system according to the present embodiment, the compressor supply flow rate can be so reduced that the actual stack supply flow rate reaches the target stack supply flow rate for the following reason when the bypass valve 26 is fully opened.

Also in the control of the cathode system according to this embodiment, the stack request compressor supply flow rate calculated in the stack request compressor supply flow rate calculation unit 103 decreases when the bypass valve 26 is fully opened and the actual stack supply flow rate becomes larger than the target stack supply flow rate. As a result, the dilution request compressor supply flow rate is selected as the provisional target compressor supply flow rate in the provisional target compressor supply flow rate setting unit 111.

Further, if the bypass valve 26 is fully opened and the actual stack supply flow rate becomes larger than the target stack supply flow rate, the electrolyte membranes become dry, whereby the actual impedance increases more than the target impedance. Then, such a stack supply flow rate that the actual impedance reaches the target impedance is calculated as the wetness request stack supply flow rate in the wetness request stack supply flow rate calculation unit 101. Thus, the wetness request stack supply flow rate becomes a value smaller than the actual stack supply flow rate when the bypass valve 26 is fully opened.

In the present embodiment, a flow rate obtained by adding the full open time estimated bypass flow rate to the wetness request stack supply flow rate is input as the compressor limiting flow rate to the target compressor supply flow rate setting unit 114.

Here, the compressor limiting flow rate input to the target compressor supply flow rate setting unit 114 when the bypass valve 26 is fully opened is the sum of the wetness request stack supply flow rate and the full open time estimated bypass flow rate. On the other hand, the dilution request compressor supply flow rate input as the provisional target compressor supply flow rate to the target compressor supply flow rate setting unit 114 can be considered as the sum of the actual stack supply flow rate (>wetness request stack supply flow rate) and the full open time estimated bypass flow rate.

Accordingly, the compressor limiting flow rate input to the target compressor supply flow rate setting unit 114 when the bypass valve 26 is fully opened becomes smaller than the dilution request compressor supply flow rate input as the provisional target compressor supply flow rate to the target compressor supply flow rate setting unit 114.

As a result, when the bypass valve 26 is fully opened, the compressor limiting flow rate is set as the target compressor supply flow rate in the target compressor supply flow rate setting unit 114.

In this way, the cathode compressor 22 is so feedback-controlled that the actual stack supply flow rate becomes a wetness supply stack supply flow rate when the bypass valve 26 is fully opened, wherefore the increased actual impedance can be converged toward the target impedance. Thus, it can be suppressed that the state where the actual stack supply flow rate is larger than the target stack supply flow rate continues, wherefore a reduction in power generation efficiency of the fuel cell stack 1 can be suppressed by suppressing the drying of the electrolyte membranes.

Figure 6:
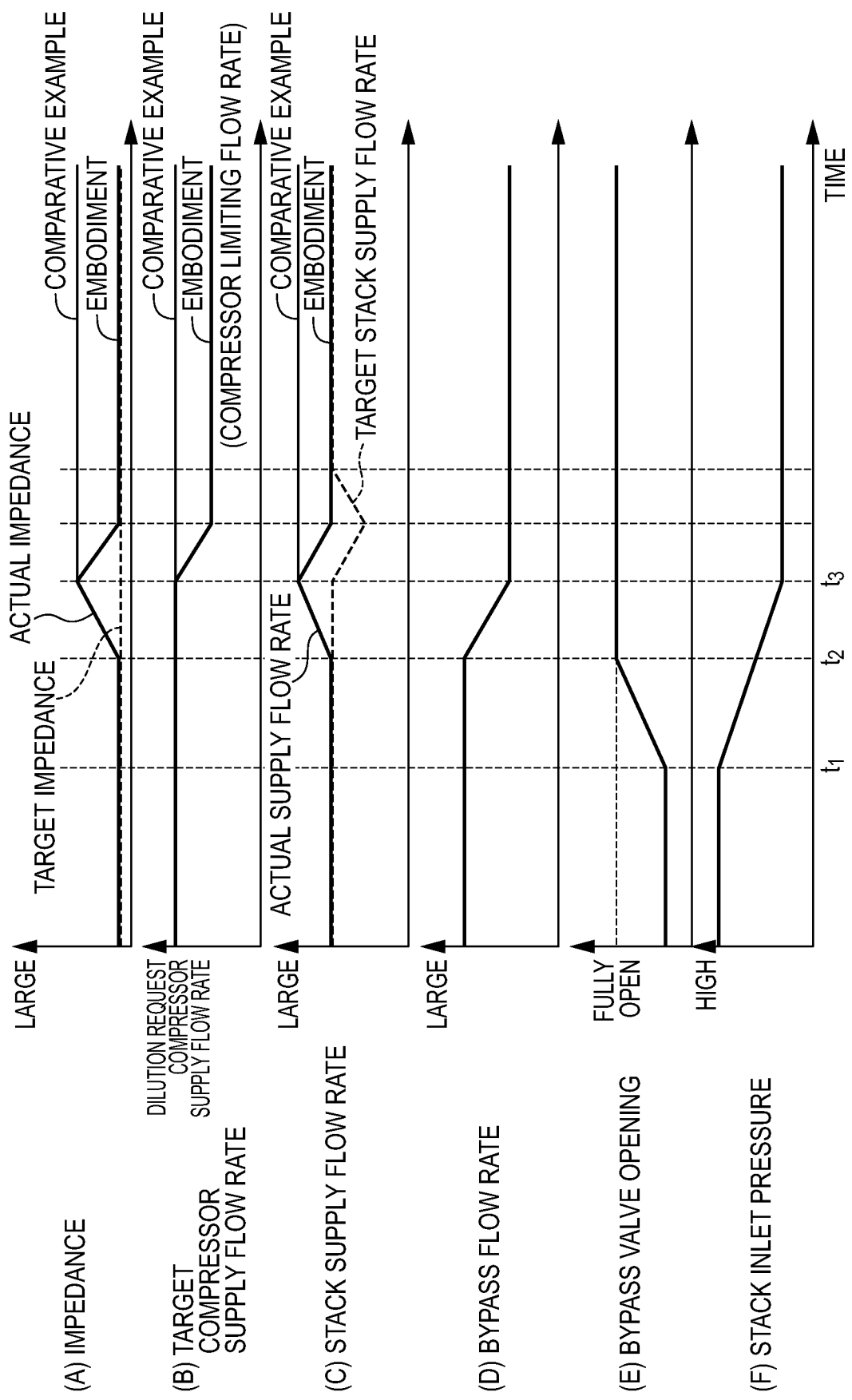
FIG. 6 is a time chart showing control operations of the cathode system according to the present embodiment.

FIG. 6 is a time chart showing control operations of the cathode system according to the present embodiment. To facilitate the understanding of the present invention, the control operations of the cathode system according to the comparative example are shown in thin solid line according to a need.

At time t1, it is assumed that the dilution request compressor supply flow rate is set as the provisional target compressor supply flow rate in the provisional target compressor supply flow rate setting unit 111 and that provisional target compressor supply flow rate is set as the target compressor supply flow rate in the target compressor supply flow rate setting unit 114.

When the discharge temperature rises to or above a predetermined allowable temperature determined from heat resistance performance and the like of the cathode compressor 22 at time t1, the cathode pressure regulating valve 24 is opened to reduce the discharge temperature, whereby the pressure at the discharge side of the cathode compressor 22 (=stack inlet pressure) decreases (FIG. 6(F)). Since the differential pressure before and after the bypass valve 26 becomes smaller if the stack inlet pressure decreases, the bypass flow rate decreases if the opening of the bypass valve 26 is the same. Thus, when the stack inlet pressure is reduced at time t1, the bypass valve 26 is gradually opened as the stack inlet pressure decreases (FIGS. 6(D) and 6(E)) in order to keep the bypass flow rate.

When the bypass valve 26 is fully opened at time t2, the bypass flow rate gradually decreases thereafter as the stack inlet pressure decreases (FIGS. 6(D) and 6(E)) and the actual stack supply flow rate becomes larger than the target stack supply flow rate (here, wetness request stack supply flow rate) (FIG. 6(C)). As a result, the actual impedance becomes larger than the target impedance (FIG. 6(A)).

When the actual stack supply flow rate becomes larger than the target stack supply flow rate, the stack request compressor supply flow rate is controlled to be so reduced that the actual stack supply flow rate reaches the target stack supply flow rate in the stack request compressor supply flow rate calculation unit 103.

However, in the case of the comparative example, the larger one of the dilution request compressor supply flow rate and the stack request compressor supply flow rate is selected as the target compressor supply flow rate in the target compressor supply flow rate setting unit 104. Thus, the dilution request compressor supply flow rate continues to be selected as the target compressor supply flow rate in the target compressor supply flow rate setting unit 104 due to a decrease in the stack request compressor supply flow rate (FIG. 6(B)).

As a result, in the case of the comparative example, the compressor supply flow rate remains to be the dilution request compressor supply flow rate, the actual stack supply flow rate cannot reach the target stack supply flow rate and the state where the actual impedance is larger than the target impedance continues even if the bypass valve 26 is opened at time t2 and the actual stack supply flow rate becomes larger than the target stack supply flow rate.

Contrary to this, in the case of the present embodiment, the compressor limiting flow rate is set as the target compressor supply flow rate in the target compressor supply flow rate setting unit 114 when the bypass valve 26 is fully opened (time t3, FIG. 6(B)).

In this way, the actual stack supply flow rate can be controlled to the wetness request stack supply flow rate and the actual impedance can be controlled to the target impedance (FIG. 6(A)) since the compressor limiting flow rate is the sum of the wetness request stack supply flow rate and the full open time estimated bypass flow rate. As a result, the drying of the electrolyte membranes can be suppressed and a reduction in power generation efficiency of the fuel cell stack 1 can be suppressed.

It should be noted that if the compressor limiting flow rate is selected as the final target compressor supply flow rate as just described when the dilution request compressor supply flow rate is selected as the provisional target compressor supply flow rate, an increase of the hydrogen concentration of the exhaust gas to or above the predetermined concentration may be prevented by executing a control to close the purge valve 35.

According to the present embodiment described above, one of the power generation request stack supply flow rate and the wetness request stack supply flow rate is calculated as the target stack supply flow rate according to the load of the fuel cell stack 1 and the bypass valve 26 is so feedback-controlled that the stack supply flow rate reaches the target stack supply flow rate.

Further, one of the stack request compressor supply flow rate and the dilution request stack supply flow rate is calculated as the provisional target compressor supply flow rate according to the operating state of the fuel cell system. If the bypass valve 26 is fully opened when the dilution request supply flow rate is selected as the provisional target compressor supply flow rate, the cathode compressor 22 is feedback-controlled with a flow rate smaller than the provisional target compressor supply flow rate set as the target compressor supply flow rate. Specifically, the cathode compressor 22 is feedback-controlled with the sum of the full open time estimated bypass flow rate and the wetness request stack supply flow rate set as the compressor limiting flow rate and the smaller one of the provisional target compressor supply flow rate and the compressor limiting flow rate set as the target compressor supply flow rate.

In this way, the cathode compressor 22 and the bypass valve 26 can be so feedback-controlled that the actual stack supply flow rate reaches the target stack supply flow rate while the dilution request is satisfied until the bypass valve 26 is fully opened.

The cathode compressor 22 can be so feedback-controlled that the actual stack supply flow rate becomes the wetness supply stack supply flow rate when the bypass valve 26 is fully opened and the actual stack supply flow rate becomes larger than the target stack supply flow rate. Thus, it can be suppressed that the state where the actual stack supply flow rate is larger than the target stack supply flow rate continues, wherefore a reduction in power generation efficiency of the fuel cell stack 1 can be suppressed by suppressing the drying of the electrolyte membranes.

As just described, according to the present embodiment, since the supply of the cathode gas unnecessary for power generation to the fuel cells can be suppressed even if the opening of the bypass valve reaches a predetermined opening (e.g. fully open) for a certain reason, the drying of the electrolyte membrane can be suppressed.

Although the embodiment of the present invention has been described above, the above embodiment is merely an illustration of one application example of the present invention and not of the nature to limit the technical scope of the present invention to the specific configuration of the above embodiment.

Although the power generation request stack supply flow rate and the wetness request stack supply flow rate have been input to the target stack supply flow rate calculation unit 102 in the above embodiment, a stack supply flow rate for preventing flooding determined according to the load of the fuel cell stack 1 may be input besides these and a maximum value of these may be set as the target stack supply flow rate.

Further, although the dilution request compressor supply flow rate and the stack request compressor supply flow rate have been input to the provisional target compressor supply flow rate setting unit 111 in the above embodiment, a compressor supply flow rate for preventing the surging of the cathode compressor 22 may be input besides these and a maximum value of these may be set as the provisional target compressor supply flow rate.

The invention claimed is:

1. A fuel cell system for generating power by supplying anode gas and cathode gas to a fuel cell stack, comprising:
   a compressor configured to supply the cathode gas;
   a bypass passage configured to discharge a part of the cathode gas discharged from the compressor to a cathode gas discharge passage while bypassing the fuel cell stack;

a bypass valve provided in the bypass passage and configured to adjust a bypass flow rate of the cathode gas flowing in the bypass passage; and a controller programmed to:
calculate a power generation request stack supply flow rate of the cathode gas to be supplied to the fuel cell stack required by a load of the fuel cell stack and calculate a wetness request stack supply flow rate required to maintain electrolyte wetness and select a larger of the power generation request stack supply flow rate and the wetness request stack supply flow rate as a target value of the stack supply flow rate;

calculate a stack request compressor supply flow rate from an actual stack supply flow rate and the target value of the stack supply flow rate;

select a provisional target value of the compressor supply flow rate of the cathode gas to be supplied by the compressor as a larger of the stack request compressor supply flow rate and a dilution request compressor supply flow rate, the dilution request compressor supply flow rate determined as a flow necessary to set a hydrogen concentration in an exhaust gas to at or below a predetermined concentration;

control the bypass valve based on the target value of the stack supply flow rate so that an actual value of the stack supply flow rate of the cathode gas to be supplied by the compressor to the fuel cell stack reaches the target value of the stack supply flow rate;

calculate a compressor limiting flow rate using the wetness request stack supply flow rate and an estimated value of the bypass flow rate determined if the bypass valve is fully opened and using atmospheric pressure, a stack inlet pressure, and a discharge temperature;

select a target compressor supply flow rate from a smaller of the provisional target value and the compressor limiting flow rate; and control the compressor so as to limit the compressor supply flow rate of the cathode gas supplied by the compressor to the target compressor supply flow rate.

2. The fuel cell system according to claim 1, wherein the controller is further programmed to:
calculate the compressor limiting flow as a sum of the wetness request stack supply flow rate and the estimated value of the bypass flow rate.

3. The fuel cell system according to claim 1, wherein the wetness request stack supply flow rate of the cathode gas required to be supplied to the fuel cell stack is calculated from a required degree of wetness and an actual degree of wetness so that the actual degree of wetness of electrolyte membranes of the fuel cell stack reaches the required degree of wetness.

4. A control method of fuel cell system for generating power by supplying anode gas and cathode gas to a fuel cell stack, the fuel cell system comprising:
a compressor configured to supply the cathode gas;

a bypass passage configured to discharge a part of the cathode gas discharged from the compressor to a cathode gas discharge passage while bypassing the fuel cell stack; and a bypass valve provided in the bypass passage and configured to adjust a bypass flow rate of the cathode gas flowing in the bypass passage, wherein the control method comprises:
a step of calculating a power generation request stack supply flow rate of the cathode gas to be supplied to the fuel cell stack required by a load of the fuel cell stack and calculating a wetness request stack supply flow rate required to maintain electrolyte wetness and selecting a larger of the power generation request stack supply flow rate and the wetness request stack supply flow rate as a target value of the stack supply flow rate;

a step of calculating a stack request compressor supply flow rate from an actual stack supply flow rate and the target value of the stack supply flow rate;

a step of selecting a provisional target value of the compressor supply flow rate of the cathode gas to be supplied by the compressor as a larger of the stack request compressor supply flow rate and a dilution request compressor supply flow rate, the dilution request compressor supply flow rate determined as a flow necessary to set a hydrogen concentration in an exhaust gas to at or below a predetermined concentration;

a step of controlling the bypass valve based on the target value of the stack supply flow rate so that an actual value of the stack supply flow rate of the cathode gas to be supplied by the compressor to the fuel cell stack reaches the target value of the stack supply flow rate;

a step of calculating a compressor limiting flow rate using the wetness request stack supply flow rate and an estimated value of the bypass flow rate determined if the bypass valve is fully opened and using atmospheric pressure, a stack inlet pressure, and a discharge temperature;

a step of selecting a target compressor supply flow rate from rate from a smaller of the provisional target value and the compressor limiting flow rate; and a step of controlling the compressor so as to limit the compressor supply flow rate of the cathode gas supplied by the compressor to the target compressor supply flow rate.

5. The method of claim 4, further comprising:
a step of calculating the compressor limiting flow rate as a sum of the wetness request stack supply flow rate and the estimated value of the bypass flow rate.

6. The method of claim 4, further comprising:
a step of calculating the wetness request stack supply flow rate of the cathode gas required to be supplied to the fuel cell stack from a required degree of wetness and an actual degree of wetness so that the actual degree of wetness of electrolyte membranes of the fuel cell stack reaches the required degree of wetness.

* * * * *